US005567343A

United States Patent [19]

Ritter et al.

[11] Patent Number: 5,567,343
[45] Date of Patent: Oct. 22, 1996

[54] NEW LEATHER OILING PREPARATIONS AND THEIR USE

[75] Inventors: Wolfgang Ritter, Hann; Hans-Dieter Sitz, Rommerskirchen; Rudolf Zauns-Huber, Duesseldorf; Emil Ruscheinsky, Leverkusen, all of Germany

[73] Assignee: Henkel Kommanditgesellschaft auf Aktien, Duesseldorf, Germany

[21] Appl. No.: 367,268

[22] PCT Filed: Jul. 5, 1993

[86] PCT No.: PCT/EP93/01730

§ 371 Date: Feb. 17, 1995

§ 102(e) Date: Feb. 17, 1995

[87] PCT Pub. No.: WO94/01587

PCT Pub. Date: Jan. 20, 1994

[30] Foreign Application Priority Data

Jul. 14, 1992 [DE] Germany ............... 42 23 111.6

[51] Int. Cl.⁶ .................................................. C14C 9/00
[52] U.S. Cl. .................. 252/857; 8/94.1 R; 8/94.22; 8/94.23; 427/389
[58] Field of Search ............ 252/857; 8/94.1 R, 8/94.22, 94.23; 427/389; 554/1; 106/2

[56] References Cited

U.S. PATENT DOCUMENTS 4,755,187 7/1988 Friese et al. ................. 8/94.23
4,946,471 8/1990 Friese et al. ................. 8/94.23
5,124,181 6/1992 Schaffer et al. ................ 427/389

FOREIGN PATENT DOCUMENTS

| 0193832 | 9/1986 | European Pat. Off. |
| 0213480 | 3/1987 | European Pat. Off. |
| 0341578 | 11/1989 | European Pat. Off. |
| 0372746 | 6/1990 | European Pat. Off. |
| 0412389 | 2/1991 | European Pat. Off. |
| 0418661 | 3/1991 | European Pat. Off. |
| 1669347 | 5/1971 | Germany. |
| 4129244 | 3/1993 | Germany. |
| 2149509 | 6/1990 | Japan. |
| 9305188 | 3/1993 | WIPO. |

*Primary Examiner*—Anthony Green
*Attorney, Agent, or Firm*—Ernest G. Szoke; Wayne C. Jaeschke; Real J. Grandmaison

[57] ABSTRACT

An aqueous dispersion of amphiphilic co-oligomers for oiling leather or skins wherein the dispersion contains co-oligomers of (a) fatty crotonates,
(b) radical-copolymerizable, hydrophilic, ethylenically unsaturated acids, anhydrides and mixtures thereof, wherein the weight ratio of (a):(b) is 30–90%:70–10%, based on the weight of (a)+(b), the dispersion having an active substance content in the range from about 30–70% by weight, based on the weight of the dispersion, and optionally
(c) copolymerizable comonomers having neither a pronounced hydrophobicizing effect nor containing hydrophilicizing groups.

20 Claims, No Drawings

NEW LEATHER OILING PREPARATIONS AND THEIR USE

BACKGROUND OF THE INVENTION

1. Field of the Invention

The oiling of vegetable- and/or mineral-tanned leathers and skins is an essential step in the finishing process leading to the ready-to-use material. The form in which the oil is distributed in the skin and the extent to which the oil components are fixed in the skin critically influence the properties and performance of the end products. Extensive expert knowledge exists on possible interactions between the oil components on the one hand and the tanned skin containing residual tanning agents on the other hand. The particular composition of the oiling preparations—for example the number of lipophilic groups and reactive groups present, if any, for reaction with suitable reactive constituents in the tanned leather—determine inter alia the permanence and effectiveness of the oil finish in the practical use of the leathers and skins.

An important practical aspect lies in the provision of oil finishes which can be so reliably fixed in the tanned skin that the leathers and skins are sufficiently resistant to washing and cleaning for practical requirements. High-quality leather goods, for example from the clothing industry, are expected to lend themselves both to washing with water/detergents and also to dry cleaning without any significant loss of quality. There are also special cases where the finished leather is required to show sufficient impermeability to water.

2. Discussion of Related Art

In principle, there are in particular three known processes for the waterproof finishing of leather and skins:

1. impregnation by incorporation of water-insoluble compounds, for example solid fats, waxes or special polymers,
2. impregnation by incorporation of water-swelling compounds which form highly viscous emulsions on taking up water and which block the fiber interstices of the leather, for example special emulsifiers of the w/o type,
3. treatment with hydrophobicizing compounds, for example aluminium, chromium and/or zirconium complexes, silicones or organic fluorine compounds.

DE 1 669 347 describes the use of water-emulsifiable sulfosuccinic acid semiesters for oiling leather, although no waterproof effects are obtained. EP 193 832 relates to a process for the production of waterproof leathers and skins using sulfosuccinic acid monoesters in combination with impregnating and/or hydrophobicizing oiling preparations, the process being characterized in that, after retanning, the leathers and skins are treated in an aqueous liquor with impregnating and/or hydrophobicizing oiling preparations containing sulfosuccinic acid monoester salts with $C_{12-24}$ fatty groups and, after acidification, are fixed by addition of a chromium, zirconium and/or aluminium salt. The sulfosuccinic acid monoester salts are preferably used with impregnating oiling preparations from the group of oxidized or oxidized and partly sulfonated $C_{18-26}$ hydrocarbons and $C_{32-40}$ waxes, phosphoric acid mono-$C_{12-24}$-alkyl esters, citric acid mono-$C_{16-24}$-alkyl esters, sorbitan, glycerol and/or pentaerythritol $C_{16-24}$ fatty acid esters.

Amphiphilic preparations in the form of selected co-oligomers of, on the one hand, hydrophobic or oleophilic monomers and, on the other hand, hydrophilic monomers have recently been described for the oiling of, in particular, mineral-tanned leathers and skins. Amphiphilic preparations of this type may be incorporated, for example by milling, in the leathers or skins to be finished in the form of aqueous dispersions, emulsions and/or solutions on completion of the main tanning process. In the case of mineral-tanned leathers or skins in particular, the amphiphilic preparations may also perform the retanning function. Finally, the amphiphilic preparations may be fixed, more particularly with mineral tanning agents. The more recent patent literature describes auxiliaries of the type in question. For example, EP 372 746 describes corresponding preparations and their use, the amphiphilic copolymers consisting predominantly of at least one hydrophobic monomer and, to a lesser extent, of at least one copolymerizable hydrophilic monomer. The hydrophobic monomers listed include long-chain alkyl (meth)acrylates, long-chain alkoxy or alkylphenoxy (polyethylene oxide) (meth)acrylates, primary alkenes, vinyl esters of long-chain alkyl carboxylic acids and mixtures thereof. The hydrophilic comonomers forming the minor component of the copolymers are ethylenically unsaturated water-soluble acids or hydrophilic basic comonomers. The molecular weight (weight average) of the copolymers is in the range from 2,000 to 100,000.

EP 412 389 describes the use of copolymers which have been prepared by radical bulk copolymerization of (a) $C_{8-40}$ monoolefins with (b) ethylenically unsaturated $C_{4-8}$ dicarboxylic anhydrides at temperatures of 80° to 300° C. to form copolymers with molecular weights of 500 to 20,000 g/mole, subsequent solvolysis of the anhydride groups of the copolymers and at least partial neutralization of the carboxyl groups formed during the solvolysis with bases in aqueous medium and which are present in the form of aqueous dispersions or solutions as preparations for hydrophobicizing leather and skins. EP 418 661 describes the use for the same purpose of copolymers which contain (a) 50 to 90% by weight of $C_{8-40}$ alkyl (meth)acrylates, vinyl esters of $C_{8-40}$ carboxylic acids or mixtures thereof and (b) 10 to 50% by weight of monoethylenically unsaturated $C_{3-12}$ carboxylic acids, monoethylenically unsaturated dicarboxylic anhydrides, semiesters or semiamides of monoethylenically unsaturated $C_{4-12}$ dicarboxylic acids, amides of $C_{3-12}$ monocarboxylic acids or mixtures thereof in copolymerized form and which have molecular weights of 500 to 30,000 g/mole. For the stated application, the copolymers are at least partly neutralized and are present in the form of aqueous solutions or aqueous dispersions.

Studies conducted by applicants have shown that comparatively low molecular weights can be crucially important to the rapid and uniform penetration of oiling compositions of this type. So far as the polymer chemist is concerned, indirect references to this effect can also be found in the last three of the above-cited documents in the description of the production of the copolymers disclosed therein. The radical copolymerization of the claimed components for (a) and (b) is best carried out in the presence of chain transfer agents, such as mercaptans (EP 372 746 A2, page 6, 20/21) and in the presence of regulators, such as $C_{1-4}$ aldehydes, allyl alcohol, but-1-en-3-ol, formic acid or organic compounds containing SH groups (EP 418 661 A1, column 6, paragraph 2). The use of corresponding regulators for obtaining polymers of sufficiently low molecular weight is also recommended in EP 412 389, see A1, column 4, paragraph 2.

Applicants' earlier patent application DE-A-P 41 29 244.8 relates to the use of aqueous dispersions of co-oligomers from the radical-initiated aqueous emulsion copolymerization at mildly acidic to neutral pH values of (a) semiesters of maleic acid with oleophilic alcohols and/or lower alkylene oxide adducts thereof and (b) acrylic acid and/or methacrylic acid
as principal components which may additionally contain
  (c) small quantities of other hydrophilic and/or oleophilic comonomers in the oligomer molecule,
as amphiphilic preparations for the oiling and water-resistant finishing of leathers and skins.

DESCRIPTION OF THE INVENTION

The teaching according to the present invention seeks to use a class of co-oligomers which has not hitherto been described for the oiling of leathers and skins. The co-oligomers selected in accordance with the invention afford important advantages both from the point of view of their production and from the point of view of their use in leathers and skins. The essence of the teaching according to the invention lies in the choice of the principal oleophilic comonomer component in the co-oligomers described hereinafter. The invention proposes using fatty crotonates which have not hitherto been described in the prior art as principal oleophilic component in amphiphilic finishes of the type in question. Crotonic acid and crotonic acid esters are accessible to radical copolymerization with hydrophilic comonomers of the type in question, although the copolymerization is comparatively difficult to carry out in relation to the comonomers selected in accordance with the prior art. Crotonic acid or rather crotonates lead in particular to comparatively rapid chain termination. The invention makes specific use of this. The co-oligomers based on fatty crotonates described hereinafter for the oiling of leathers and skins have comparatively uniform and, at the same time, limited molecular weights, even without the use of molecular-weight-regulating chain transfer agents. Accordingly, co-oligomers based on fatty crotonates are particularly suitable for the rapid and penetrative impregnating finishing of leather and/or skins. After their introduction into the skin or rather fiber structure, the co-oligomers can be firmly and reliably anchored therein so that washing-resistant and also cleaning-resistant leathers and skins can be obtained. By adapting the particular quantity ratios between oleophilic components and hydrophilic components in the amphiphilic co-oligomer in known manner, not only is it possible to obtain reliable oiling, the finished material can also be waterproofed if desired.

In a first embodiment, therefore, the present invention relates to the use of water-dispersible and/or water-emulsifiable co-oligomers of
  (a) fatty crotonates and
  (b) radical-copolymerizable hydrophilic ethylenically unsaturated acids and/or anhydrides thereof which may also contain
  (c) small quantities of other copolymerizable comonomers,
as amphiphilic preparations for the oiling and optionally waterproof finishing of leathers and skins.

In this embodiment, the teaching of the invention can be of particular importance for the finishing of mineral-tanned leathers and/or skins. In the context of this treatment, the above-described amphiphilic preparations according to the invention may also take over or rather perform a retanning function.

In another embodiment, the present invention relates to aqueous dispersions of the amphiphilic co-oligomers of components (a) and (b) and optionally (c) defined above, the ratios by weight of (a) to (b) being in the range from 30 to 90% by weight of (a) to 70 to 10% by weight of (b) (percentages by weight, based on the sum of (a)+(b)), the aqueous dispersions being adjusted to pH values in the neutral to mildly basic range and being formulated in particular as water-dilutable water-based pastes with active substance contents of around 30 to 75% by weight.

The basic element of the teaching according to the invention is the use of the amphiphilic co-oligomers using fatty crotonates as the principal constituent of the oleophilic units in the oligomer molecule. Co-oligomers containing esters or ester mixtures of crotonic acid and $C_{10-40}$ fatty alcohols as component (a) are preferably used. Particularly important components (a) are fatty crotonates based on $C_{12-24}$ fatty alcohols. Corresponding crotonic acid esters with at least predominantly linear fatty alcohols may be preferable in this regard. However, it has been found that, in certain cases, the use of branched fatty alcohols in component (a) can also lead to interesting results. For example, the ability of the co-oligomer to penetrate into the fiber structure of the skin to be finished can be enhanced by using branched-chain alcohols to a limited extent. It is also possible in this regard to use corresponding branched alcohols with a smaller number of carbon atoms, corresponding components containing at least 6 carbon atoms and preferably at least 8 carbon atoms being suitable. 2-Ethylhexanol is an important branched-chain alcohol which may be used in conjunction with the fatty crotonates of component (a). However, the quantity of branched-chain and, in particular, relatively short-chain alcohols to be used will always be comparatively limited. Thus, generally no more than 50% by weight and preferably no more than 30% by weight or no more than 20% by weight of the alcohol components present in (a) will be formed by branched-chain, more particularly lower alcohols. For practical purposes, quantities of at least about 90 to 95% by weight—based on the oleophilic comonomer component (a)—of the pronounced oleophilic long-chain fatty alcohols, more particularly in the $C_{12-18}$ range, have proved to be particularly suitable components for forming the crotonate esters.

The hydrophilic components (b) used in the amphiphilic co-oligomers according to the invention may correspond to the corresponding units in the co-oligomers of EP 372 746, 412 389 and 418 661 cited above. The last of these documents in particular contains full details of suitable classes of compounds and mentions many special representatives. The disclosures of these prior-art documents are hereby specifically included as part of the disclosure of the present invention.

Particularly important comonomer components (b) in the context of the present invention are ethylenically unsaturated monocarboxylic acids and/or ethylenically unsaturated dicarboxylic acids and/or anhydrides thereof preferably containing up to 12 carbon atoms. The dicarboxylic acids may also be at least partly present in the form of their partial derivatives containing a carboxyl group and a derivatized carboxylic acid group, for example as dicarboxylic acid semiesters.

Particularly interesting representatives from the class of monoethylenically unsaturated $C_{3-12}$ monocarboxylic acids are, for example, acrylic acid, methacrylic acid and crotonic acid. However, dicarboxylic acids and derivatives thereof, particularly anhydrides, may also be particularly suitable as comonomers (b) for the teaching according to the invention. Typical representatives are maleic acid, fumaric acid, itaconic acid, glutaconic acid and corresponding anhydrides. Maleic anhydride (MAH) can be of particular importance so far as the production of the co-oligomers is concerned. Fatty crotonates of the type used as component (a) in accordance with the invention and maleic anhydride may be satisfactorily reacted in the presence or absence of auxiliary solvents to form co-oligomers of low and readily adjustable molecular weight. More particularly, substantially equal molar quantities of MAH and fatty crotonate can be reacted with one another so that, after solvolysis, more particularly hydrolysis, of the MAH units, sufficiently high concentrations of carboxyl groups for fixing the oligomers in the skin or rather fiber structure on the one hand and also reliably high contents of the oleophilic and hence oiling and water-repellent fatty crotonate unit on the other hand are incorporated.

However, in addition to or instead of these hydrophilic oligomer components based on carboxylic acids, other copolymerizable hydrophilic compounds may be used as component (b). Ethylenically unsaturated monomers containing sulfonic acid groups are particularly suitable for this purpose. Known representatives of this type are, in particular, corresponding aliphatic and/or aromatic sulfonic acids, such as styrene sulfonic acid, and also compounds, such as vinylsulfonic acid, allylsulfonic acid, methallylsulfonic acid and the like. As already mentioned, component (b) of the amphiphilic preparations may be formed completely or partly from such copolymerizable or co-oligomerizable sulfonic acid compounds.

According to the invention, co-oligomers of the described type in which components (a) and (b) are present in ratios of 30 to 90% by weight of (a) to 70 to 10% by weight of (b) (percentages by weight, based on the sum of components (a) and (b)) are preferably used as the amphiphilic active substances. Preferred ranges for the mixing ratios are of the order of 35 to 80% by weight of (a) to 65 to 20% by weight of (b)—percentages by weight, based on the sum of (a) and (b).

As mentioned above, however, small quantities of other copolymerizable comonomers which are mentioned as component (c) in the definition of the invention may also be present in addition to components (a) and (b) in the amphiphilic co-oligomers. Any co-oligomerizable, ethylenically unsaturated compounds of the type described in the relevant prior art, cf. for example EP 418 661 A1, column 3, 49 to column 4, 27, are suitable for this purpose. The compounds in question are generally comonomers which neither have a pronounced hydrophobicizing effect nor contain hydrophilicizing groups like the carboxyl groups or sulfonic acid groups of components (b) used in accordance with the invention. Where comonomers (c) such as these are used in the amphiphilic co-oligomers according to the invention, their percentage content is preferably no more than about 30% by weight and, in particular, no more than about 15% by weight, based on the sum of (a), (b) and (c).

Particularly suitable co-oligomers for the purpose according to the invention are free or substantially free (i.e. contain no more than about 5% by weight) from the components (c) and contain components (a) and (b) in ratios of around 40 to 70% by weight of (a) to 60 to 30% by weight of (b), based on the sum of (a)+(b).

The co-oligomers based on the fatty crotonates have preferred average molecular weights in the range from about 500 to 30,000 g/mole. Molecular weights in the range from about 1,000 to 15,000 g/mole can be particularly suitable. It has been found that, within these comparatively broad ranges, the lower values—average molecular weights in the range from about 1,000 to 4,000 or 5,000 g/mole and best in the range from about 1,000 to 3,000 g/mole—can be particularly important.

As mentioned above, particularly suitable amphiphilic preparations according to the invention may be assigned to the class obtainable by reaction of fatty crotonates and maleic anhydride in which the MAH component has been converted into the oligomer molecule containing free carboxyl groups by hydrolysis and/or solvolysis with H-active components. Alcohols in particular and also other compounds, such as carboxylic acids, amino compounds containing reactive hydrogen and the like are suitable for solvolysis of the MAH ring with H-active components. By subjecting the MAH component in the oligomer to controlled solvolysis in this way, it is possible specifically to influence, i.e. enhance, the oiling or water-repellent properties of the amphiphilic preparations to be used in accordance with the invention. The ratio of oleophilic groups to hydrophilic groups can be displaced towards the water-repellent oleophilic elements by using sufficiently long hydrocarbon chains.

However, the amphiphilic co-oligomers may also be obtained, for example, as follows: in a first process step, the free crotonic acid and maleic anhydride are reacted with one another to form the oligomer compound. The crotonic acid constituents are then esterified with the desired fatty alcohols or fatty alcohol mixtures in the absence of water with rapid elimination of the water of condensation. This is followed by hydrolysis or solvolysis of the anhydride rings to form the amphiphilic preparations ultimately required.

According to the invention, the co-oligomers ultimately used are best present in the form of aqueous dispersions and/or emulsions which have preferably been adjusted to a mildly acidic to mildly alkaline pH value. So far as stability in storage is concerned, it can be useful to formulate preparations of which the aqueous phase is adjusted to neutral to mildly alkaline pH values by addition of inorganic and/or organic bases. Any bases described in the relevant prior art may be used for pH adjustment, cf. also the disclosures of the prior art cited at the beginning. The alkali metal salts, especially the sodium and/or potassium salts, are particularly preferred. However, ammonium salts or salts of alkanolamines, such as diethanolamine, are also suitable representatives. Preferred pH values for storable products may be in the range from pH 7 to 8. Water-based pastes with a co-oligomer content of, for example, around 30 to 70 or 75% by weight can be prepared in this way. Pastes such as these can always be mixed with water and/or aqueous active-substance mixtures of the type described hereinafter and used in practice.

One important embodiment of the invention is characterized by the use of amphiphilic preparations of the described type together with selected emulsifiers which, on introduction into—in particular—mineral-tanned leathers and/or skins, have an additional oiling or hydrophobicizing effect and which, at the same time, can preferably be fixed in the tanned leather or skin through acidic groups. One important example of compounds of this type are the water-emulsifiable sulfosuccinic acid semiesters mentioned at the beginning which emanate from long-chain fatty alcohols and/or alkylene oxide adducts thereof. The foregoing observations on the fatty crotonates (a) apply to the particular character of the alcohols. One important example of emulsifiers belonging to the class in question are $C_{18}$ sulfosuccinate semiesters. It has been found that advantageous effects can be achieved by using emulsifier-like auxiliary components such as these—which are known per se as leather oiling finishes—to assist in solving the problem addressed by the present invention. The following are mentioned as examples of compounds of this type: sulfosuccinic acid semiesters of long-chain fatty alcohols containing in particular 12 to 24 carbon atoms and/or alkylene oxide adducts thereof preferably containing up to 6 alkylene oxide units, corresponding sulfosuccinic acid semiesters of fatty acid mono- and/or diglycerides or alkylene oxide adducts thereof preferably containing up to 6 alkylene oxide groups for a preferred chain length of the fatty acid(s) of $C_{12-24}$, long-chain sulfofatty acids, more particularly corresponding alpha-sulfofatty acids preferably containing 12 to 24 and, more preferably, 16 to 18 carbon atoms (in the case of these alpha-substituted sulfofatty acids, the hydrocarbon radicals are normally saturated) and internal sulfofatty acids of monoolefinically and/or polyolefinically unsaturated carboxylic acids, such as oleic acid, linoleic acid, linolenic acid and the like.

However, oiling or hydrophobicizing preparations based on the mixtures known from EP 193 832 cited at the beginning may also be used together with the co-oligomers for the purposes of the invention. In this embodiment of the invention, therefore, the co-oligomers of (a) and (b) and optionally (c) defined in accordance with the invention—combined with impregnating and/or hydrophobicizing oiling agents, such as sulfosuccinic acid monoester salts with $C_{12-24}$ fatty groups—are used in combination with other impregnating oiling agents selected in particular from the group of oxidized or oxidized and partly sulfonated $C_{18-26}$ hydrocarbons or $C_{32-40}$ waxes. Other examples of these additional impregnating oiling agents are phosphoric acid mono-$C_{12-24}$-alkyl esters, partial esters of polycarboxylic acids, such as citric acid mono-$C_{16-24}$-alkyl esters, partial esters of polyalcohols, such as sorbitan, glycerol or pentaerythritol $C_{16-24}$ fatty acid esters.

One particularly suitable class of emulsifiers which may be used in accordance with the teaching of the invention are the N-acylaminoacids known from the oiling of leathers and skins, more particularly the fatty acid sarcosides (for example N-oleoyl sarcosine) which are described in detail in EP-B1 0 213 480, for example, as emulsifiers for the introduction of silicone oils into leathers and skins. Accordingly, particularly suitable emulsifiers are salts of N-($C_{9-20}$ acyl)-aminoacids, particular significance being attributed to corresponding salts of a $C_{2-6}$ aminoacid substituted at the amine nitrogen by the acyl group of a saturated or unsaturated $C_{9-20}$ fatty acid which may optionally be additionally substituted by methyl. Particularly suitable salts of these emulsifiers are, again, alkali metal, ammonium or alkanolamine salts.

Of the N-($C_{9-20}$ acyl)-aminoacids, those containing 2 to 4 carbon atoms with the amino group in the alpha-position to the carboxyl group, which moreover may additionally be substituted by a methyl group at the amine nitrogen atom, are preferred. Of these, the fatty acid sarcosides of saturated or unsaturated fatty acids containing 9 to 20 and preferably 16 to 18 carbon atoms have a particularly superior effect. The preferred sarcoside is oleic acid sarcoside. In addition, N-stearoyl sarcosine, N-lauroyl sarcosine and N-isononanoyl sarcosine—in the form of their alkali metal salts, ammonium salts or salts of mono-, di- or trialkanolamines, in particular with 2 to 4 carbon atoms in the alkanol group—are particularly suitable.

Where mixtures such as these are used, the quantity of co-oligomers of (a) and (b) and optionally (c) according to the invention preferably makes up at least about 35% by weight and, more preferably, at least about 50% by weight of the mixture (on the same basis as before). In one preferred embodiment, at least about 70 to 80% by weight of the total mixture to be introduced into the leathers or skins to be finished may be based on the fatty crotonate co-oligomers according to the invention.

The co-oligomers in the form of an aqueous dispersion or in the form of mixtures with the other components mentioned are introduced in known manner, cf. in particular the disclosures of the above-cited documents for comparable products. Accordingly, their introduction may be briefly summarized as follows:

The co-oligomer dispersions according to the invention are suitable for the treatment of any standard tanned skins, more particularly corresponding material which has been tanned with mineral tanning agents. The tanned skins are normally deacidified before the treatment. They may have been dyed before the treatment. However, dyeing may also be carried out after the treatment according to the invention.

The leather to be impregnated is treated with the dispersions in an aqueous liquor, best at pH values of around 4 to 10 and preferably at pH values of 5 to 8 and at temperatures of around 20° to 60° C. and preferably at temperatures of 30° to 50° C. over a period of up to a few hours and optionally in several stages. The treatment is carried out, for example, by milling in a drum. The quantity of co-oligomer dispersion required is normally 0.1 to 30% by weight and, more particularly, 1 to 20% by weight, based on the pared weight of the leather or the wet weight of the skins. The length of the liquor is normally 10 to 1,000% and preferably 30 to 150% and, in the case of skins, from 50 to 500%.

On completion of the treatment with the aqueous liquor, the pH of the treatment liquor is shifted to a mildly acidic value by addition of acids. Organic acids, preferably formic acid, are particularly suitable for this purpose. Preferred pH values are in the range from 3 to 5 and more preferably in the range from around 3.5 to 4. If desired, the pH adjustment may be followed by fixing, more particularly with mineral tanning agents, the use of aluminium salts and also other polyvalent mineral salts, for example chromium or zirconium salts, being particularly preferred.

The following Examples describe the production of co-oligomers suitable for use in accordance with the invention and then their use for the finishing of leather in accordance with the invention.

EXAMPLES

Example 1

700 g of a $C_{16/18}$ fatty alcohol crotonate (45–55% $C_{16}$; 45–55% $C_{18}$ fatty alcohols), 300 g of maleic anhydride and 250 g of xylene were weighed into a 3 liter reactor. At a constant bath temperature of 175° C., the reaction mixture was heated to the boiling temperature of the xylene. At an internal temperature of 150° C., 47.5 g of tert.butyl perbenzoate in 47.5 g of xylene were added dropwise over a period of 2 h. Through the onset of polymerization, the internal temperature rose to 164° C. After the initiator had been added, the mixture was left to react for 2 hours at 160° C., after which another 2.5 g of tert.butyl perbenzoate in 2.5 g of xylene were added. After a reaction time of 2 h at 160° C., the xylene was removed in vacuo (50–200 mbar).

After cooling to 80° C., 1,500 g of water and 30.6 g of NaOH were added so that a partly neutralized stable dispersion was formed.

| Residual monomers: | |
| --- | --- |
| $C_{16}$ crotonate: | 5.1% |
| $C_{18}$ crotonate: | 6.3% |
| Maleic anhydride: | <0.1% |
| Molecular weights: | |

-continued

| | |
|---|---|
| Mw: | 2,100 g/mole |
| Mn: | 1,200 g/mole |
| Solids contents: | 40.2% by weight |

Example 2

600 g of a $C_{16/18}$ fatty alcohol crotonate (45–55% $C_{16}$; 45–55% $C_{18}$ fatty alcohols), 400 g of maleic anhydride and 176 g of xylene were weighed into a 3 liter reactor. At a constant bath temperature of 160° C., the reaction mixture was heated to the boiling temperature of the xylene. At an internal temperature of 150° C., 47.5 g of tert.butyl perbenzoate in 117.8 g of xylene were added dropwise over a period of 2 h. Through the onset of polymerization, the internal temperature rose to 169° C. After the initiator had been added, the mixture was left to react for 2 hours at 150° C., after which another 2.5 g of tert.butyl perbenzoate in 6.2 g of xylene were added. After a reaction time of 2 h at 150° C., the xylene was removed in vacuo (50–200 mbar).

After cooling to 80° C., 2,333 g of water and 54.4 g of NaOH were added so that a partly neutralized stable dispersion was formed.

| Residual monomers: | |
|---|---|
| $C_{16}$ crotonate: | 3.9% |
| $C_{18}$ crotonate: | 4.3% |
| Maleic anhydride: | <0.01% |
| Molecular weights: | |
| Mw: | 2,000 g/mole |
| Mn: | 1,350 g/mole |
| Solids content: | 30.1% by weight |

Example 3

5,600 g of a $C_{16/18}$ fatty alcohol crotonate (45–55% $C_{16}$; 45–55% $C_{18}$ fatty alcohol), 2,400 g of maleic anhydride and 1,800 g of xylene were weighed into a 25 liter reactor. At a constant bath temperature of 170° C., the reaction mixture was heated to the boiling temperature of the xylene. At an internal temperature of 150° C., 400 g of tert.butyl perbenzoate in 600 g of xylene were added dropwise over a period of 2 h. The internal temperature was kept at 150° C. during the reaction. After the initiator had been added, the mixture was left to react for 2 hours at 150° C., after which another 80 g of tert.butyl perbenzoate were added. After a reaction time of 2 h at 150° C., the xylene was removed in vacuo (50–200 mbar).

After cooling to 80° C., 16,000 g of water and 371 g of NaOH were added so that a partly neutralized stable dispersion was formed.

| Residual monomers: | |
|---|---|
| $C_{16}$ crotonate: | 5.6% |
| $C_{18}$ crotonate: | 6.1% |
| Maleic anhydride: | <0.1% |
| Molecular weights: | |
| Mw: | 2,100 g/mole |
| Mn: | 1,300 g/mole |
| Solids content: | 34.4% by weight |

Example 4

172.2 g of crotonic acid, 206.1 g of maleic anhydride and 100 g of xylene were weighed into a 3 liter reactor. At a constant bath temperature of 175° C., the reaction mixture was heated to the boiling temperature of the xylene. At an internal temperature of 150° C., 18 g of tert.butyl perbenzoate in 64 g of xylene were added dropwise over a period of 2 h. The internal temperature during the polymerization reaction was 150° C. After the initiator had been added, the reaction mixture was left to react for 2 hours at 150° C., after which another 1 g of tert.butyl perbenzoate in 4 g of xylene was added. After a reaction time of 2 h, 515 g of Stenol 1618 (45–55% $C_{16}$; 45–55% $C_{18}$ fatty alcohol) were added. The polymer was azeotropically esterified with the fatty alcohol over a period of 7 h at an internal temperature of 160° C. 34.1 g of water were obtained, corresponding to an esterification conversion of 95%. On completion of esterification, the xylene was removed in vacuo (50–200 mbar).

After cooling to 80° C., 1,340 g of water and 40 g of NaOH were added so that a partly neutralized stable dispersion was formed.

| Residual monomers: | |
|---|---|
| Stenol 1618: | 4.7% |
| Maleic anhydride: | 0.15% |
| Crotonic acid: | 0.05% |
| Molecular weights: | |
| Mw: | 10,600 g/mole |
| Mn: | 1,000 g/mole |
| Solids content: | 40.1% by weight |

Example 5

The products produced in accordance with Examples 1 to 4 were used and tested in the leather test (formulation) described at the end of this Example.

The good to very good hydrophobicizing results shown in Table I below (obtained using a Bally penetrometer in conjunction with test IUP 10 of the Internationale Union der Leder-Chemiker-Verbände, Kommission für physikalische Lederprüfung, cf. das Leder, Vol. 12, 36–40 (1961)) were obtained.

TABLE I

| | Penetrometer values at 15% compression | | | |
|---|---|---|---|---|
| Examples | 1 | 2 | 3 | 4 |
| Water penetration | >420 <24 | >24 | >420 | 180 |
| Water absorption 24 h | 30% | 28% | 35% | 58% |

Resistance to washing and dry cleaning were tested by the following methods:

The conditioned test leathers are cut into 10 cm×10 cm squares. They are accurately measured, the surface area is established and the samples are weighed before washing and dry cleaning.

a) Washing tests

The leather samples are individually washed in water at 60° C. using a phosphate-free laundry detergent (Persil®). The test is intended to simulate the conditions under which a sports shoe is washed in a domestic washing machine. After washing, the leather samples are dried in air.

b) Dry cleaning

The leather samples are individually cleaned with perchloroethylene in a dry cleaning machine. After cleaning, the leather samples are aired.

After the washing test (a) and the dry cleaning test (b), the leathers are conditioned for 24 hours in accordance with DIN 53303. The characteristic data are determined and evaluated for both tests.

The excellent results obtained are set out in Table II below:

TABLE II

| Examples | | Resistance to washing and dry cleaning | | | |
|---|---|---|---|---|---|
| | | 1 | 2 | 3 | 4 |
| Resistance to washing | w | +1.02% | +2.5% | +2.6% | +2.8% |
| | A | −5.9% | −5.9% | −5.8% | −6.1% |
| Resistance to dry cleaning | w | −5.6% | −5.7% | −5.6% | −5.6% |
| | A | −6.6% | −6.9% | −6.8% | −7.0% | w = Difference in weight (− = reduction; + = increase)
A = Difference in area (− = reduction; + = increase)

The leather samples tested were finished as follows:

Type of leather: furniture leather
Starting material: wet blue
Percentages based on pared weight
Initial pH: 3.9   Thickness: 1.1 mm

| Step | % by weight | Product/remarks | °C. | Running time in mins. | pH |
|---|---|---|---|---|---|
| Washing | 200 | Water | 40 | | |
| | 0.1 | Formic acid | | 30 | 3.5 |
| | | Drain off liquor | | | |
| Neutralization | 100 | Water | 40 | | |
| | 1 | Na formate | | 10 | 4.2 |
| | +2 | Na bicarbonate | | 6 | 5.8 |
| | | Drain off liquor | | | |
| Washing | 300 | Water | 50 | 15 | |
| | | Drain off liquor | | | |
| Dyeing | 100 | Water | 50 | | |
| | 1 | Ammonia | | | |
| | 1 | Commercial product "PELLUPUR 400 N" | | 15 | 8 |
| | +3 | Dye | | 45 | |
| Finishing (hydrophobicizing + retanning) | +6 | Active substance Fatty oligomers acc. to invention | | | |
| | 1 | Active substance Sulfosuccinate | | 90 | |
| | +3 | Mimosa | 30 | 15 | |
| | +1.5 | Formic acid | | 15 | |
| | +1.5 | Formic acid | | 30 | 3.8 |
| | | Drain off liquor | | | |
| Fixing | 100 | Water | 40 | | |
| | 0.5 | Formic acid | | 10 | 3.5 |
| | +4 | Commercial product "BAYCHROM F" | | 90 | 3.9 |
| | | Drain off liquor | | | |
| Washing | 300 | Water | 40 | 15 | |
| | | Drain off liquor | | | |
| Washing | 300 | Water | 30 | 15 | |

Hoard up leather overnight, tenter wet, dry at 50° C./40% relative air humidity, condition, mill, tenter.

The commercial products referred to above are defined in the following:

"PELLUPUR 400 N" is a complex-active, dispersing and levelling dyeing aid

"BAYCHROM F" is an organically masked self-basifying 50% basic chrome tanning agent.

We claim:

1. An aqueous dispersion of amphiphilic co-oligomers for oiling leather or skins, said dispersion comprising co-oligomers of
   (a) fatty crotonates, and
   (b) radical-copolymerizable, hydrophilic, ethylenically unsaturated acids, anhydrides and mixtures thereof, wherein the weight ratio of (a):(b) is 30–90%:70–10%, based on the weight of (a)+(b), said dispersion having an active substance content in the range from about 30–70% by weight, based on the weight of said dispersion.

2. The dispersion of claim 1 wherein said fatty crotonates are esters derived from crotonic acid and $C_{10}$–$C_{40}$ fatty alcohols.

3. The dispersion of claim 1 wherein said component (b) is selected from the group consisting of ethylenically unsaturated monocarboxylic acids, ethylenically unsaturated anhydrides, ethylenically unsaturated dicarboxylic acids, ethylenically unsaturated dicarboxylic anhydrides, aliphatic sulfonic acids, aromatic sulfonic acids, and mixtures thereof.

4. The dispersion of claim 3 wherein said component (b) contains from 3 to 12 carbon atoms.

5. The dispersion of claim 3 wherein said component (b) is selected from the group consisting of acrylic acid, methacrylic acid, maleic anhydride, maleic acid, crotonic acid, and fumaric acid.

6. The dispersion of claim 1 containing copolymerizable comonomers free of hydrophilicizing groups as component (c), said component (c) being present in an amount of up to 30% by weight, based on the weight of (a)+(b)+(c).

7. The dispersion of claim 1 wherein said co-oligomers have an average molecular weight in the range from about 500 to 30,000 g./mole.

8. The dispersion of claim 1 further containing an emulsifier selected from the group consisting of sulfosuccinic acid semiesters of long-chain fatty alcohols containing 12 to 24 carbon atoms, alkylene oxide adducts of sulfosuccinic acid semiesters of long-chain fatty alcohols containing 12 to 24 carbon atoms and having up to 6 alkylene oxide units, sulfosuccinic acid semiesters of fatty acid mono- or di-glycerides, alkylene oxide adducts of sulfosuccinic acid semiesters of fatty acid mono- or di-glycerides having up to 6 alkylene oxide units and containing 12 to 24 carbon atoms, alpha-sulfofatty acids containing 12 to 24 carbon atoms, internal sulfonates of mono- or poly-olefinically unsaturated fatty acids containing at least 12 carbon atoms, salts of an amino acid containing 2 to 6 carbon atoms attached at the amine nitrogen atom to an acyl group of a saturated or unsaturated fatty acid containing 9 to 20 carbon atoms, fatty acid sarcosides, and mixtures thereof.

9. The dispersion of claim 1 wherein said dispersion contains impregnating or hydrophobicizing leather oiling agents consisting essentially of sulfosuccinic acid esters having $C_{12-24}$ fatty residues in combination with a compound selected from the group consisting of oxidized or oxidized and partly sulfonated $C_{18-26}$ hydrocarbons, $C_{32-40}$ waxes, phosphoric acid mono-$C_{12-24}$alkyl esters, partial esters of polycarboxylic acids, partial esters of polyalcohols, and mixtures thereof.

10. The dispersion of claim 1 wherein said dispersion has a pH in the range from 7 to 8.

11. A process for oiling leather or skins comprising contacting said leather or skins with an aqueous dispersion of amphiphilic co-oligomers, said dispersion comprising co-oligomers of (a) fatty crotonates, and (b) radical-copolymerizable, hydrophilic, ethylenically unsaturated acids, anhydrides and mixtures thereof, wherein the weight ratio of (a):(b) is 30–90%:70–10%, based on the weight of (a)+(b), said dispersion having an active substance content in the range from about 30–70% by weight, based on the weight of said dispersion.

12. The process of claim 11 wherein said fatty crotonates are esters derived from crotonic acid and $C_{10}$–$C_{40}$ fatty alcohols.

13. The process of claim 11 wherein said component (b) is selected from the group consisting of ethylenically unsaturated monocarboxylic acids, ethylenically unsaturated anhydrides, ethylenically unsaturated dicarboxylic acids, ethylenically unsaturated dicarboxylic anhydrides, aliphatic sulfonic acids, aromatic sulfonic acids, and mixtures thereof.

14. The process of claim 13 wherein said component (b) contains from 3 to 12 carbon atoms.

15. The process of claim 13 wherein said component (b) is selected from the group consisting of acrylic acid, methacrylic acid, maleic anhydride, maleic acid, crotonic acid, and fumaric acid.

16. The process of claim 11 wherein said dispersion contains copolymerizable comonomers free of hydrophilicizing groups as component (c), said component (c) being present in an amount of up to 30% by weight, based on the weight of (a)+(b)+(c).

17. The process of claim 11 wherein said co-oligomers have an average molecular weight in the range from about 500 to 30,000 g./mole.

18. The process of claim 11 wherein said dispersion further contains an emulsifier selected from the group consisting of sulfosuccinic acid semiesters of long-chain fatty alcohols containing 12 to 24 carbon atoms, alkylene oxide adducts of sulfosuccinic acid semiesters of long-chain fatty alcohols containing 12 to 24 carbon atoms and having up to 6 alkylene oxide units, sulfosuccinic acid semiesters of fatty acid mono- or di-glycerides, alkylene oxide adducts of sulfosuccinic acid semiesters of fatty acid mono- or di-glycerides having up to 6 alkylene oxide units and containing 12 to 24 carbon atoms, alpha-sulfofatty acids containing 12 to 24 carbon atoms, internal sulfonates of mono- or poly-olefinically unsaturated fatty acids containing at least 12 carbon atoms, salts of an amino acid containing 2 to 6 carbon atoms attached at the amine nitrogen atom to an acyl group of a saturated or unsaturated fatty acid containing 9 to 20 carbon atoms, fatty acid sarcosides, and mixtures thereof.

19. The process of claim 11 wherein said dispersion contains impregnating or hydrophobicizing leather oiling agents consisting essentially of sulfosuccinic acid esters having $C_{12-24}$ fatty residues in combination with a compound selected from the group consisting of oxidized or oxidized and partly sulfonated $C_{18-26}$ hydrocarbons, $C_{32-40}$ waxes, phosphoric acid mono-$C_{12-24}$alkyl esters, partial esters of polycarboxylic acids, partial esters of polyalcohols, and mixtures thereof.

20. The process of claim 11 wherein said dispersion has a pH in the range from 7 to 8.

\* \* \* \* \*